3,178,864
PREPARATION OF GLASS CELLS CONTAINING HELIUM OF HIGH PURITY
Harold W. Anderson, deceased, late of Janesville, Wis., by Fred W. Anderson, Janesville, Wis., and Massachusetts Institute of Technology, Cambridge, Mass., legal representatives, Charles R. Larkin, Fairfax, Va., and Wellman L. Clark, Silver Spring, Md., assignors to the United States of America as represented by the Secretary of the Navy
Filed Jan. 25, 1963, Ser. No. 254,027
9 Claims. (Cl. 53—22)
(Granted under Title 35, U.S. Code (1952), sec. 266)

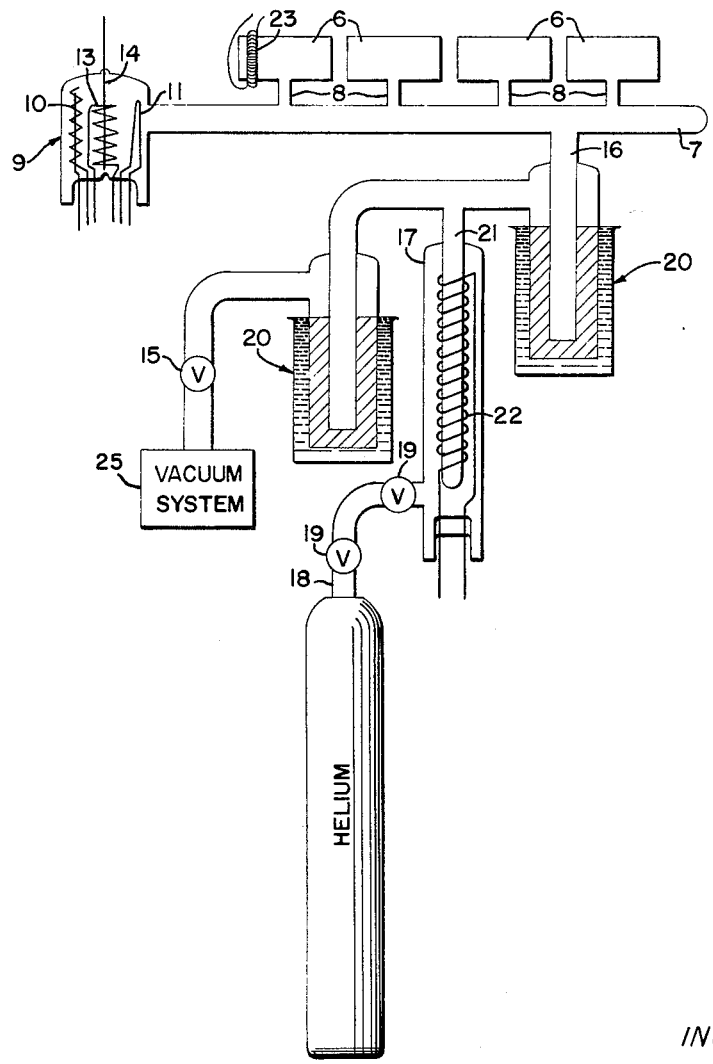

The invention described herein may be manufactured and used by or for the Government of the United States of America for governmental purposes without the payment of any royalties thereon or therefor.

This invention relates to a method for preparing glass cells containing helium of high purity, and more particularly to the process of eliminating adsorbed and absorbed impurities from the cells by utilizing a vacuum, a microwave discharge and titanium gettering process.

In the past, the apparatus and methods utilized to produce cells containing pure helium for use over a long period of time have utilized the conventional processes of outgassing through baking and high vacuum, magnesium or barium gettering, cold trapping, and cataphoretic purification of commercially spectroscopically pure helium. These methods have proved to be generally unsuccessful, since the equipment is large and expensive, and the resultant cells produced have not been completely satisfactory since the useful life, before being contaminated by impurities, has been rather short.

The present invention provides a process for producing cells of ultra-high purity helium which have a long useful operating life and produce a greater signal output in use by combining, in a novel combination, apparatus for creating a high vacuum, for diffusing helium through a heated fused silica tube, for freeing adsorbed and absorbed impurities from the cells by a microwave discharge, and for pumping by titanium gettering of the freed impurities.

An object of the present invention is to provide cells capable of sustaining metastable helium and having a long useful life.

Another object of the present invention is to provide cells of high purity helium by pumping with a titanium gettering process after separation from the main vacuum system.

A further object is to produce cells of high purity helium by outgassing the cells by a microwave discharge.

Other objects and features of the invention will become apparent to those skilled in the art as the disclosure is made in the following description of an illustrative embodiment of the invention as illustrated in the accompanying sheet of drawings in which:

The single figure schematically illustrates the apparatus utilized in the production of cells of high purity helium.

Referring to the drawing, a plurality of glass cells 6 are each connected to a manifold 7 by a glass tube 8. One end of the manifold 7 is closed while the other end is connected to a titanium vapor gage pump 9. The titanium vapor gage pump 9 is preferably a form of a well known Bayard Alpert vacuum pump and has contained within it a tungsten filament 10 to heat the interior and a titanium filament 11 which pumps a vacuum by adsorbing some of the elements of the gases when heated by an electrical current. Also constructed within the titanium vapor gage pump is an ionization gage having a grid 13 and a plate 14 to measure the pressure present by electrically measuring the electron flow between the cathode and the plate by suitable apparatus (not shown).

Also joined to the manifold 7 is a glass tube 16 leading to a suitable high vacuum pump 25 and a suitable valve 15 for sealing off the vacuum pump from the manifold after a predetermined maximum vacuum is obtained by the vacuum pump. Connected to this glass tube 16 between the valve or seal-off and the manifold 7 is a helium reservoir 17 which is connected to a source of helium by another glass tube 18 having a second set of valves 19 for isolating the helium tank from the reservoir after a measured quantity, as determined by the volume of the glass tube between valves 19, of helium is introduced into the reservoir. Contained within the helium reservoir 17 is a thin-walled closed, fused silica tube 21 surrounded by a Nichrome heater 22. The heater wires extend outside of the helium reservoir to a suitable source of potential (not shown) for heating the silica tube 21 to allow the diffusion of the helium from the reservoir 17 through the silica tube 21. Two standard cold traps 20 containing a copper baffle and surrounded by liquid nitrogen separate and isolate the helium source from the vacuum pump 25 and the manifold 7. Shown surrounding one of the glass cells 6 is an electrical coil 23 which is connected through a suitable microwave cavity resonator (not shown) for heating and exciting the glass cells and the gas contained therein to release adsorbed and absorbed impurities.

The process involved in producing the cells utilizes the apparatus as illustrated in the drawing. The cells are first simultaneously evacuated by the high vacuum pump and initially outgassed by applying heat to the cells. Helium from a commercial helium tank, not necessarily the spectroscopically pure helium, is then admitted to the helium reservoir 17 and the helium valves 19 are sealed so that the helium tank may then be disconnected from the system. By means of heat supplied by a current applied to the Nichrome heater 22, helium is diffused through the thin-walled fused silica tube 21. The glass cells 6 are then further outgassed by applying a microwave discharge to the coil 23 by a cavity resonator (not shown). The coil is passed over the cells to free further the adsorbed and absorbed impurities from the cells. A vacuum pump is then utilized to pump down the system again and the vacuum valve 15 is sealed. If desired, at this point, the vacuum pump may be separated from the system. At this time, a very small amount of helium is present in the cells 6 so that when a potential is applied to the titanium vapor gage 9 the titanium filament 12 sublimes by conduction heating. Electron bombardment of titanium may also be employed in place of conduction heating. The release of the titanium condenses with other elements to produce an effective pump to further reduce the impurities within the cells. This pumping action by the titanium removes contaminants such as carbon monoxide and hydrogen. After this, more helium is diffused to the system through the silica tube 21 by the heat produced by the Nichrome heater 22. The cells are again subjected to the microwave discharge through the coil 23 and the subsequent gettering by the titanium vapor gage pump 9. Titanium is again sublimed from the electrode and again condenses with some of the foregoing contaminants. During this entire operation the pressure within the cells is monitored by the ionization gage of the titanium vapor gage 9 consisting of the grid 13 together with the plate 14 and a Pirani gage or a thermocouple. The cells 6, at this time, contain helium of high purity and are sealed off from the manifold 7 by heating the glass tubes 8 by a flame.

The vacuum pump utilized is a conventional mechanical fore pump in series with two mercury diffusion pumps which are capable of reducing the pressure to $10^{-7}$ to $10^{-8}$ torr. The mechanical pumping action is generally maintained until the aforementioned pressure is obtained. In the first step the apparatus is baked for a period of twelve to twenty-four hours at 300–400° C. while under the high vacuum. The preliminary baking is utilized to drive off a high percentage of the adsorbed and absorbed impurities from the glass. The outgassing from evaporation of the titanium diode or filament is maintained for approximately two minutes at which time a visible coating of titanium will appear and the adsorption of the impurities levels off to a constant rate as determined by the ionization pressure gage. Sublimation of the titanium begins at approximately 1400° C. so that the criteria for the operation of the titanium diode or filament is at a temperature at least 1400° C. and can be operated at ranges up to approximately 2200° C., the melting temperature of titanium. The helium is admitted to the cells by diffusion through the silicia or quartz in the first instance to a pressure of approximately 0.1 to 1.0 millimeter of mercury as determined with the vacuum pump shut off from the system. The final helium pressure from the second diffusion step is in the range of 0.1 to 5.0 millimeters of mercury depending upon the use to be made of the helium cell. A helium cell used for a magnetometer generally has approximately 0.25 millimeter of mercury while a helium cell utilized as a helium lamp will be in the vicinity of 5.0 millimeters of mercury. The rate of diffusion of helium through a fused silica tube can be predicted by a formula. Operating at a temperature of approximately 750° C. it takes approximately thirty minutes to obtain the desired pressure of the helium at the lower ranges. The diffusion of helium through the fused silica or quartz glass tube is continued for a sufficient amount of time to obtain the desired pressure of helium within the cells. The microwave discharge in the first instance is continued for approximately ten minutes to drive off the impurities of the cell while in the second instance the microwave discharge is utilized for a two-fold purpose; the first being to examine spectroscopically the purity of helium and the second purpose being to drive off any impurities that may appear by spectroscopic analysis.

Although the foregoing steps have been for the production of a helium cell containing a fixed or a predetermined pressure of helium, as determined by the pressure at the time of seal-off, the apparatus is sufficiently small to be maintained as a unit. If the apparatus is maintained as a unit it is possible to vary the pressure of the helium while in use by adding more helium as desired. Of course, if more helium is added, further purification by the titanium gettering and the discharge is sometimes required.

The apparatus of the present invention provides a novel combination for removing the atmospheric pressure and a great quantity of the impurities by a vacuum system, a subsequent diffusion of helium to the cells, and a further reduction of the impurities of the cells may be achieved by use of microwave discharges and titanium gettering. In this manner, the elements of the apparatus mutually cooperate to produce helium cells of high purity which have a relatively long useful life up to approximately two years. The two-year limit on the life span is not primarily due to the impurities of the cell when the cell is made, but occurs due to the unavoidable diffusion of helium through the cell wall over a period of time. Overexcitation of the cell can also shorten the two-year life span.

Various modifications are contemplated and may obviously be resorted to by those skilled in the art without departing from the spirit and scope of the invention, as hereinafter defined by the appended claims, as only an illustrative embodiment thereof has been disclosed.

What is claimed is:

1. Apparatus for producing cells of pure helium comprising, in combination;
   a manifold having attached thereto at least one glass cell to be filled with pure helium,
   an evacuation system for creating an initially high vacuum and having a valve connecting the evacuation system to the manifold for disconnecting the evacuation system from the manifold after a predetermined vacuum is obtained,
   a heated thin-walled silica tube connected to said manifold for diffusing helium therethrough after the vacuum is created by said evacuation system,
   a microwave discharge means adjacent to said cell for outgassing said cell,
   and means connected to said manifold for subliming titanium.

2. Apparatus as recited in claim 1 wherein said thin-walled silicia tube is partially surrounded by a Nicrome heater for heating said tube,
   and a helium reservoir encloses said tube and said heater.

3. Apparatus as recited in claim 1 wherein said microwave discharge means comprises a coil energized by a high frequency microwave generator.

4. The method of producing cells containing pure helium comprising the steps of;
   evacuating the cells,
   diffusing helium through heated silica to the cells,
   separating impurities in the cells by microwave discharge,
   and outgassing the impurities within the cells by subliming titanium.

5. The method of producing cells containing pure helium comprising the steps of;
   simultaneously and continuously evacuating the cells to a maximum pressure of $10^{-9}$ millimeters of mercury and heating the cells to a temperature of at least 300° C. for a period of at least twelve hours,
   diffusing helium through heated glass to a predetermined pressure,
   separating impurities from the cells by a microwave discharge,
   and outgassing and pumping by adsorption with sublimed titanium until a constant reduced pressure is obtained.

6. The method as recited in claim 5 comprising the further step of separating and sealing the cells by flaming off the cells at a temperature near the softening point of the glass.

7. The method of producing cells containing pure helium comprising the steps of;
   simultaneously and continuously evacuating the cells to a maximum pressure of $10^{-9}$ millimeters of mercury and heating the cells to a temperature of at least 300° C. for a period of at least twelve hours,
   outgassing and pumping by absorption with sublimed titanium until a constant reduced pressure is obtained,
   diffusing helium through heated silica to approximately 0.1 to 1.0 millimeter of mercury,
   outgassing the cells by a microwave discharge for a period of approximately ten minutes,
   evacuating the cells to a maximum of pressure of $10^{-9}$ millimeters of mercury,
   outgassing and pumping by adsorption with sublimed titanium until a constant reduced pressure is obtained,
   diffusing helium through heated silica to a predetermined pressure in the range of 0.1 to 5.0 millimeters of mercury,
   spectroscopically examining and outgassing the cells by microwave discharge,
   and outgassing and pumping the cells by absorption with sublimed titanium until a constant reduced pressure is obtained.

8. The method as recited in claim 7 comprising the further step of separating and sealing the cells by flaming off at a temperature near the softening point of glass.

9. The method of producing cells containing pure helium comprising the steps of;

simultaneously and continuously evacuating the cells to a maximum pressure of $10^{-9}$ millimeters of mercury and heating cells to a temperature in the range of 300–500° C. for a period of between twelve to twenty-four hours, diffusing helium through a heated silica tube to the cells to a predetermined pressure in the range of 0.1 to 5.0 millimeters of mercury, separating impurities from the cells by a microwave discharge for a period of approximately ten minutes, and outgassing and pumping the cells by adsorption with sublimed titanium for a period of approximately two minutes until a constant reduced pressure is obtained.

References Cited by the Examiner

UNITED STATES PATENTS

| 1,732,336 | 10/29 | Lohman | 141—8 |
| 2,464,765 | 3/49 | Palmer | 53—39 XR |
| 2,796,555 | 6/57 | Connor. | |
| 3,100,274 | 8/63 | Luftman et al. | 230—69 XR |

OTHER REFERENCES

"Helium Separation and Purification Diffusion." In Bell Laboratory Report. Vol. 36; pages 262–263. July 1958.

"Purification of Rare Gases." In Industrial and Engineering Chemistry. Vol. 48, No. 2; page 289–296. February 1956

LAVERNE D. GEIGER, *Primary Examiner.*